(12) United States Patent
White

(10) Patent No.: US 8,943,096 B2
(45) Date of Patent: Jan. 27, 2015

(54) METHOD AND APPARATUS FOR STORING, SHARING, AND/OR ORGANIZING PERSONAL INFORMATION

(75) Inventor: Job White, Gainesville, FL (US)

(73) Assignee: Stone Vault, LLC, Starke, FL (US)

( * ) Notice: Subject to any disclaimer, the term of this patent is extended or adjusted under 35 U.S.C. 154(b) by 0 days.

(21) Appl. No.: 13/531,355

(22) Filed: Jun. 22, 2012

(65) Prior Publication Data

US 2012/0331005 A1     Dec. 27, 2012

Related U.S. Application Data

(60) Provisional application No. 61/499,844, filed on Jun. 22, 2011.

(51) Int. Cl.
  *G06F 17/30*     (2006.01)
(52) U.S. Cl.
  CPC .... *G06F 17/30011* (2013.01); *G06F 17/30126* (2013.01)
  USPC ........................................................ 707/781
(58) Field of Classification Search
  None
  See application file for complete search history.

(56) References Cited

U.S. PATENT DOCUMENTS

| | | | |
|---|---|---|---|
| 6,412,070 B1 * | 6/2002 | Van Dyke et al. | 726/17 |
| 2009/0094459 A1 * | 4/2009 | Schneider | 713/178 |

OTHER PUBLICATIONS

Ubuntu Linux Bible: Featuring Ubuntu 10.04 LTS, Third Edition, By: William von Hagen, Publisher: John Wiley & Sons, Publication Date: Jun. 1, 2010, ISBN: 978-0-470-60450-2, chapters 27 and 34.*

* cited by examiner

*Primary Examiner* — Jay Morrison
(74) *Attorney, Agent, or Firm* — Saliwanchik, Lloyd & Eisenschenk

(57) ABSTRACT

Embodiments of the subject invention relate to systems and methods for presenting and managing user information. Specific embodiments allow creating, editing, presenting, and storing user information. In a more specific embodiment, the systems and methods can be used to provide a digital safe deposit box (DSDB) that allows users to save, maintain, update, and/or share information about themselves and/or their organization. Specific embodiments provide a personal financial solution that is designed for customers interacting with professional institutions, such as accounting firms, banks, and insurance agencies, and/or interacting with family members and people that may need to access certain documents. Embodiments of the invention provide individuals, based on permission granted/allocated to them, access to specific information, while providing safety from fraud.

20 Claims, 14 Drawing Sheets

| What is this? | Intro video | How it works | Company | Sign up | Log out |

Personal Financial Statement (PFS3) Details:

| Name | Manish |
|---|---|
| Date | 3/06/2011 |

| Assets | Amount in |
|---|---|
| Cash-FD | 20,900 |
| Cash-SB | 1,00,000 |
| Stock/Bond | 45,000 |
| Life Insurance | 66,000 |
| Personal | 2,34,856 |
| .... | |
| .... | |
| Total asset | 5,00,856 |

| Liabilities | Amount in |
|---|---|
| Current debt | 13,000 |
| Notes payable | 5,000 |
| Taxes payable | 32,840 |
| Mortgages | 32,098 |
| .... | |
| .... | |
| Total Liabilities | 62,938 |

[Back]

| What is this? | Intro video | How it works | Company | Sign up | Log out |

Personal Financial Statement Form:

| Name | |
|---|---|
| Date | |

| Assets | Amount in Rupee |
|---|---|
| Cash-FD | |
| Cash-SB | |
| Stock/Bond | |
| Life Insurance | |
| Personal property | |
| ..... | |
| ..... | |
| Total asset | |

| Liabilities | Amount in Rupee |
|---|---|
| Current debt | |
| Notes payable | |
| Taxes payable | |
| Mortgages | |
| ..... | |
| ..... | |
| Total Liabilities | 62,938 |

[ Create ] [ Cancel ]

Default Vaults:

| | |
|---|---|
| Tax | |
| PPS | |

Corporate Users

Add Letter to File
Letter Includes
- Prepared date
- Company letterhead
- Company Name
- Digital signature
- Date of data
- Saved to PDF
- Allow Professionals to:
  - Complete data
  - Review data Insurance
Estate Planning
Custom vaults Doesn't fall under

210

Back to Vault details

FIG. 7

METHOD AND APPARATUS FOR STORING, SHARING, AND/OR ORGANIZING PERSONAL INFORMATION

CROSS-REFERENCE TO RELATED APPLICATION

The present application claims the benefit of U.S. Provisional Application Ser. No. 61/499,844, filed Jun. 22, 2011, the disclosure of which is hereby incorporated by reference herein in its entirety, including any figures, tables, or drawings.

BACKGROUND OF INVENTION

In the normal course of everyday interactions, there is often a vast amount of information received that must be stored, updated, organized, and/or shared. The ability to organize and update information and retrieve that information is vital. Oftentimes, the information that must be maintained is sensitive, confidential, or personal in nature and, if shared, should only be available to select individuals on an "as-needed" basis. For example, a considerable amount of information is received and maintained regarding various financial matters. A variety of information such as checking account statements, tax returns, insurance information, and loan information, is kept by most individuals or organizations. Sometimes it is necessary to share certain types of information during interactions with professional institutions, such as accounting firms, banks, and insurance agencies, as well as with family members, trustees, attorneys, and other individuals that may be involved with our finances and/or other personal information.

Most individuals or organizations utilize computers to keep track of and maintain their information. Accordingly, most information is digitized in some computer readable format and stored on some type of computer or memory storage device. However, if the information needs to be shared, it is often either printed again or transferred to a portable computer readable format (e.g., CD, DVD, flash-drive, etc.) and transported to the individual that needs to see it. This can be a time-consuming process. But, more importantly, the information may no longer be secure and subject to inappropriate or unauthorized dissemination once it is removed from the computer.

Accordingly, there is a need for centralized, user controlled, information storage that allows users to store, organize, and share information. There is also a need for users to be able to control who has access to particular information and control how long they have such access.

BRIEF SUMMARY

Embodiments of the subject invention relate to systems and methods for presenting and managing user information. Specific embodiments allow creating, editing, presenting, and storing user information. In a more specific embodiment, the systems and methods can be used to provide a digital safe deposit box (DSDB) that allows users to save, maintain, update, and/or share information about themselves and/or their organization.

Specific embodiments provide a personal financial solution that is designed for customers interacting with professional institutions, such as accounting firms, banks, and insurance agencies, and/or interacting with family members and people that may need to access certain documents. Embodiments of the invention provide individuals, based on permission granted/allocated to them, access to specific information, while providing safety from fraud.

In particular embodiments, the subject invention provides accounting software for accumulation of transactions that provide the capabilities and resources to do one or more of the following:

Online storage of important document(s)

Customer friendly interactive software to create and manage personal financial statements Each customer can create one or more financial profile(s)

Allow peace of mind for customers that their documents are active, stored, filed, and organized in an easily accessible manner.

Advantageously, embodiments of the subject DSDB are designed to perform a dual role for users, as a secure method of allowing access to necessary information by professionals at professional institutions, such as accounting firms, banks, and insurance agencies, as well as allowing access to certain information to people, such as personal family members, trustees, attorneys, and other important people associated with the user's personal financial situation.

Utilizing the embodiments of the subject invention, trusted individuals or financial advisors can be given limited access to any DSDB, or individual file within a DSDB. Permission is specific to an individual and can be time limited, enabled, or revoked at any point by the user/account owner.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. Thus, understanding that these drawings depict only typical embodiments of the invention and are not therefore to be considered as limiting in scope, the invention will be described and explained with additional specificity and detail through the use of the accompanying drawings in which:

FIG. 5 illustrates an example layout for a "Personal Financial Statement Details" web page in accordance with an embodiment of the subject invention.

FIG. 6 illustrates a "Personal Financial Statement Form" web page in accordance with an embodiment of the subject invention.

FIG. 7 illustrates a "Default Vaults" web page in accordance with an embodiment of the subject invention.

DETAILED DISCLOSURE

Figure 1:
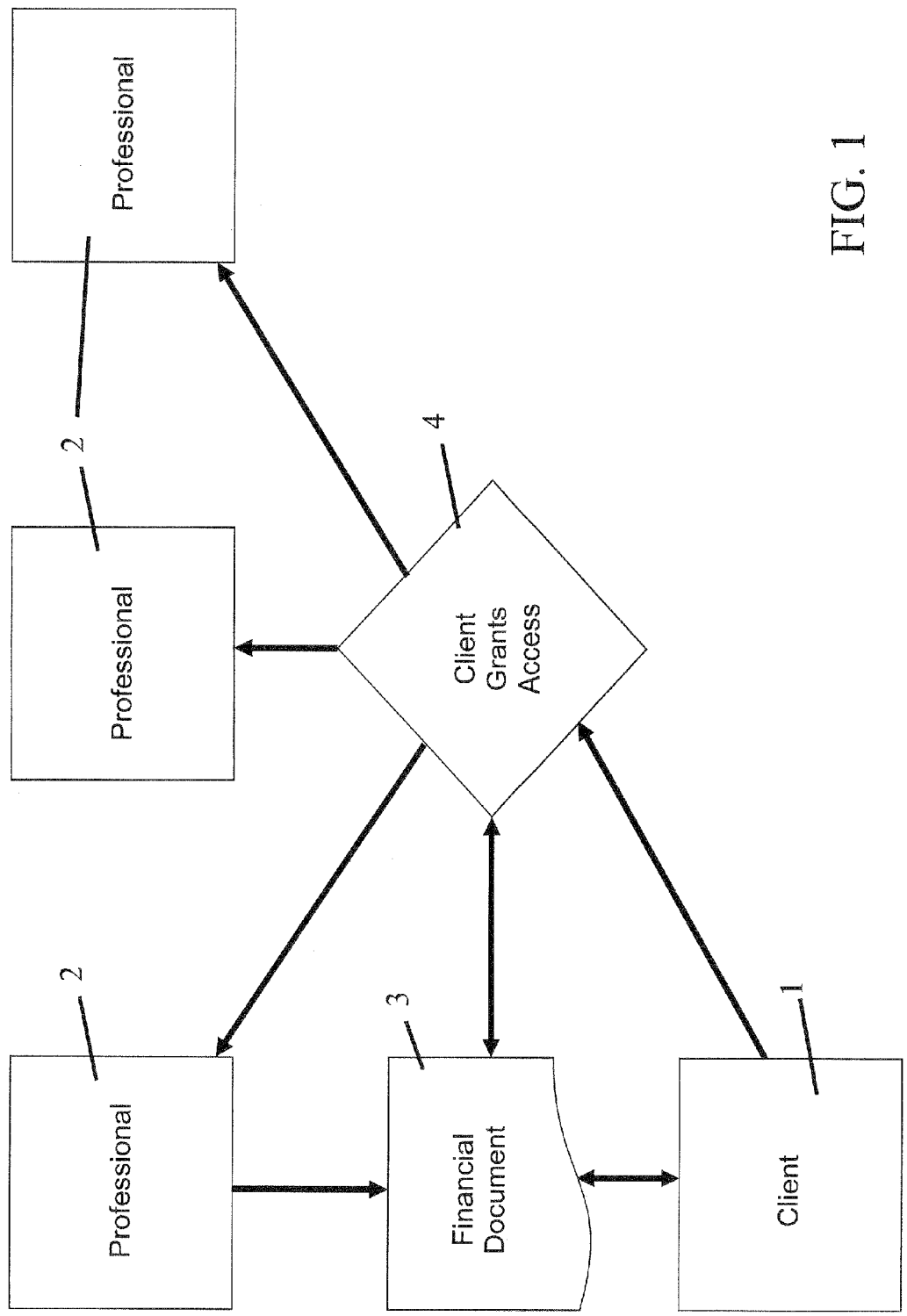
FIG. 1 shows a schematic of a specific embodiment of the subject invention.

Embodiments of the subject invention relate to a method and apparatus for saving, storing, maintaining, updating, sharing, and/or organizing personal information. Specific embodiments incorporate financial information. Specific embodiments of the subject invention pertain to a software-as-a-service (SaaS) product designed for individuals, businesses, organizations, and/or other groups to save, store, maintain, update, share, and/or organize financial and/or personal information for safekeeping. In one embodiment, a user can control who has access to, what information they have access to, when they have access, and how long they have access to the information. In more particular embodiments, financial information is stored in various folders and organized as a "Digital Safe Deposit Box" (DSDB).

The following description will disclose that the subject invention is particularly useful in the field of personal computing, in particular the use of personal computers and related software and/or hardware for storing, sharing, and organizing information for the purpose of providing select access to such information. However, a person with skill in the art will be able to recognize numerous other uses that would be applicable to the devices and methods of the subject invention. While the subject application will proceed with describing embodiments for personal use, other modifications apparent to a person with skill in the art and having benefit of the subject disclosure are contemplated to be within the scope of the present invention.

In an embodiment, one or more steps of a method for creating, storing, sharing, and organizing a DSDB are performed by one or more suitably programmed computers. In a particular embodiment, at least one of these steps is performed by the one or more suitably programmed computers. Computer-executable instructions for performing these steps can be embodied on one or more computer-readable media as described below. In an embodiment, the one or more suitably programmed computers incorporate a processing system as described below. In an embodiment, the processing system is part of a single user system, multi-user system, intranet system or internet (World Wide Web) system.

In an embodiment, computer-executable instructions for providing a user interface can be embodied on one or more computer-readable media as described below. In an embodiment, the interface can be presented on one or more suitably programmed computers. In an embodiment, the one or more suitably programmed computers incorporate a processing system as described below. In an embodiment, the processing system is part of part of a single user system, multi-user system, intranet system or internet (World Wide Web) system.

In an embodiment, one or more components of a data structure for an embodiment of the subject DSDB is embodied on one or more computer-readable media as described below. In an embodiment, the data structure can be accessed via one or more suitably programmed computers. In an embodiment, the one or more suitably programmed computers incorporate a processing system as described below. In an embodiment, the processing system is part of part of a single user system, multi-user system, intranet system or internet (World Wide Web) system.

As used herein, the terms "user" or "client" refer to, without limitation, individuals, groups, organizations, or other entities utilizing the herein described embodiments of the subject invention. Thus, while the embodiments disclosed herein are explained with reference to individual use, it should be understood that these embodiments can also be used to store, share, and organize any of a variety of types of information for any type of user or client.

The present invention is more particularly described in the following examples that are intended to be illustrative only since numerous modifications and variations therein will be apparent to those skilled in the art. As used in the specification and in the claims, the singular for "a," "an" and "the" include plural referents unless the context clearly dictates otherwise.

With reference to the attached figures, which show certain embodiments of the subject invention, it can be seen that the subject invention comprises embodiments of a Digital Safe Deposit Box (DSDB) that can be organized in any of a variety of ways. In one embodiment, a DSDB can be organized as follows:

Tax Returns—arranged by year, and each year will have all tax returns named by the client in a PDF file.

2. Insurance—arranged by type of insurance, named by the client in a PDF file.

3. Estate Planning—arranged by date, named by the client in a PDF file.

4. Miscellaneous—arranged by date, named by the client in a PDF file, and includes important information not fitting in other files.

5. Personal Financial Statements—arranged by date, named by the client in a PDF file. Users can create and store information pertaining to a financial statement. A CPA can attach a report letter to the Personal Financial Statements.

Although embodiments are described that store documents as PDF's, other file formats for storing documents that are known in art, such as WORD and JPEG, as well as many others, and can be utilized with embodiments of the subject invention.

In one embodiment, a graphical user interface (GUI) is utilized to interact with the DSDB. In a more specific embodiment, a personal computer is utilized to interface with a GUI arranged in the format of an internet website with various pages for displaying information and allowing various interactions with the DSDB.

In one embodiment, content and data existing on the internet is expressed on web pages as an organization of text and graphical information, some of which is configured as interactive hyperlinks, all of which can be formatted using HTML for presentation to an end user's PC via HTTP communication protocols.

FIG. 1 shows a schematic of an embodiment of the subject invention. The client 1, which can be, for example, an individual, business entity, or other group or entity, can interconnect with a system, such as a DSDB 4, in order to grant access to one or more individuals or business entities 2, such as an attorney, an accountant, a law firm, a bank, an insurance company, a family member, and/or a trustee, in order to allow such individual or business entity full or partial access to information, documents, financial information, financial documents, legal information, legal documents, and/or other materials stored, accessed by, filed, or otherwise controlled by the system. Such access can be characterized by a status of the individual or entity, can be specific to the individual or entity, can be limited to viewing only, can allow ability to update and/or amend, can be limited in time (time period, length of time), can be limited to certain documents or information, can be limited to certain type(s) of information or documents (legal, financial, personal, business), or otherwise controlled. The information and/or documents 3, such as a financial document shown in FIG. 1, can be stored in the system and/or accessed by the system. Specific embodiments, such as shown in FIG. 1, can allow the client and/or one or more individuals or entities to access one or more of the documents and/or information outside of the system. As an example, the system can have access to a client's tax return, to which the client and/or the client's accountant may also have independent access, as shown in FIG. 1.

Again, referring to FIG. 1, an embodiment of the subject invention is shown where a professional 2 uploads a document 3 on behalf of the client 1. The client 1 is notified and promoted with a link to take ownership of the document 3. The client can grant access to the document to one or more professionals, including or not including the professional that uploaded the document. The client can see the professionals that have access to the document. In a specific embodiment, one or more of the professionals having access to the document cannot see which other professionals have access to the document. The client can revoke access to the document for any of the professionals previously granted access without revoking access to the document for one or more other professionals to whom access has been previously granted, such that access for each professional can be separately controlled. The system can selectively allow one or more of the client and the various professionals to be allowed access to read, add, and/or remove documents and/or information. A preferred embodiment maintains a record of any modification, such as adding, removing, or editing, of a document by the client and/or professional user by stamping the modification on a duplicate of the document to preserve an audit trail of which user modified the document and when the document was modified.

Figure 2:
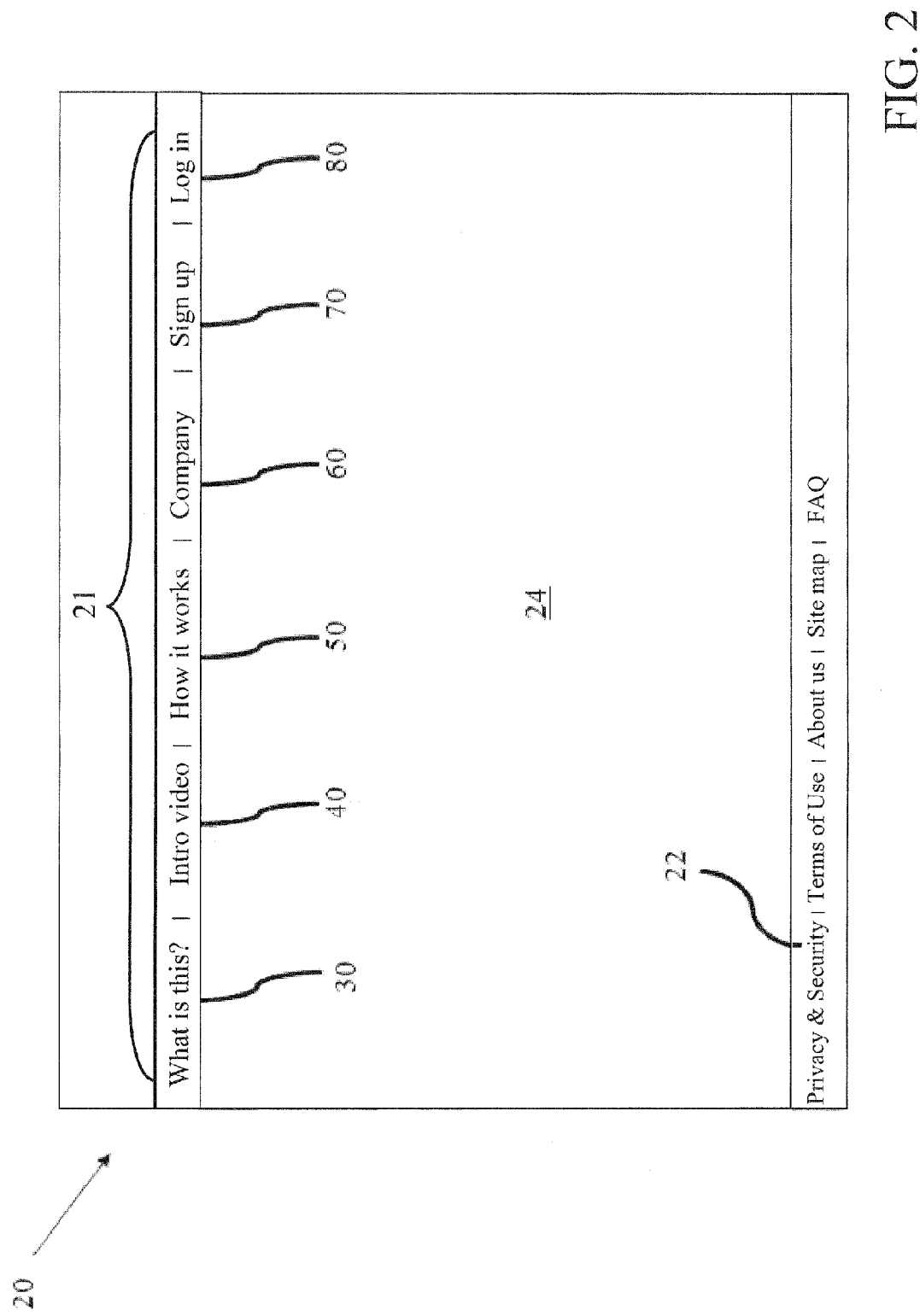
FIG. 2 illustrates an example layout for a Home web page in accordance with an embodiment of the subject invention.

In order to better facilitate an understanding of the embodiments of the subject invention, a number of screen shots of exemplary web pages for use by a user will now be described. More specifically, a number of screen shots of exemplary web pages for use by a user in an embodiment of a DSDB system will now be described. For purposes of description of this embodiment, references to the actions of a user or client of the DSDB system should be understood to mean actions that are taken on one or more of the web pages. These web pages demonstrate how portions of such a system may be constructed as well as illustrate how some of the methods for presenting entity information described may be realized in practice. These descriptions of specific embodiments are intended to be illustrative, but not limiting, of the scope of the present invention as set forth in the claims. One of ordinary skill in the art would recognize many other modifications and alternative embodiments. In particular, while a web page graphical user interface (GUI) is described, many other types of computer programs, routines, and interfaces may be used to implement the DSDB system or any of the described methods. With reference to FIG. 2, it can be seen that in one embodiment that initiation of the GUI is in the form of in opening Home Page 20. The Home page 20 can display all of the available menu items of the website. In one embodiment, the Home page 20 includes page tabs 21 that can be activated, such as, but not limited to, the following:

What is this? (30): describes about the product personal financial statement and its goal
Into video (40)
How it works (50)
Company (60)
Sign up (70)
Log in (80)

In a further embodiment, a footer 22 at the bottom of the Home Page 20 can include various GUI activation buttons that can be activated by a user to display information, such as, for example, a privacy policy, terms of use, a Frequently Asked Questions (FAQ) page(s), a site map, and an "About Us" page that can display company information, history, contact information or other information.

In a further embodiment, the Home Page 20 comprises a display area 24 in which the page tabs can display various information as it is activated. Thus, the Home Page 20 and all associated activation tabs, buttons, etc. can be viewable at all times. In one embodiment, a user can switch displays or activate multiple overlying displays by activating multiple tabs and/or footer buttons.

In a further embodiment, the page tabs 21 when activated will display drop-down menus from which the client can make a selection. Upon making a selection, an appropriate sub-page will appear within the display area 24.

In an embodiment, a web page showing the results of selecting the "What is this?" tab 30 on the home page 20 will display information about the product and its intended use(s) within the display area 24.

Figure 3:
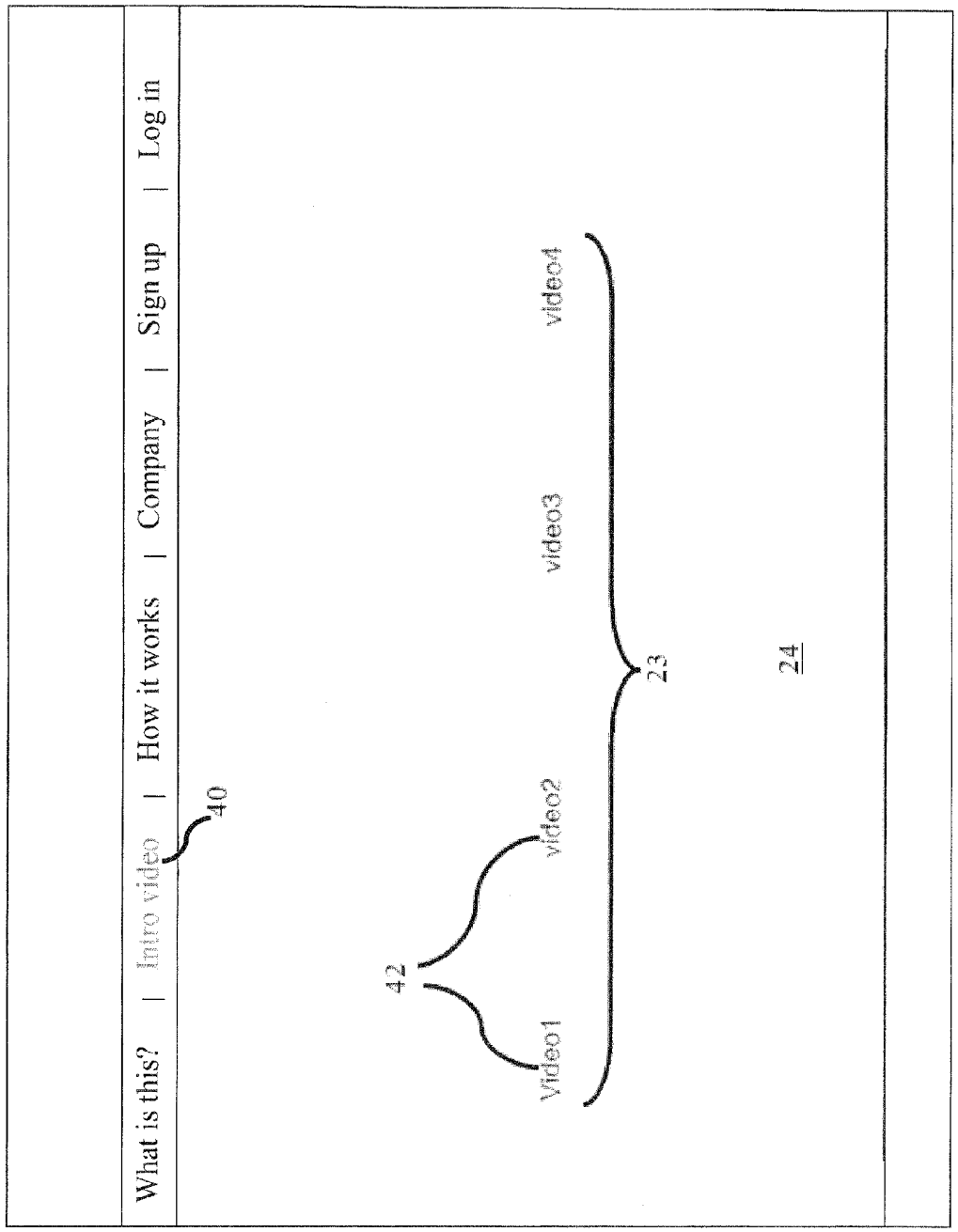
FIG. 3 illustrates an example layout for an "Into video" web page in accordance with an embodiment of the subject invention.

FIG. 3 illustrates an example of a web page showing the results of selecting the "Intro Video" tab 40 on the home page 20. In one embodiment, one or more video selection icons 42 are made available to the client. Selecting one of the icons will display the sample videos through which one can learn about how it works for personal financial statements. In one embodiment, the selected video will play within a "thumbnail" screen in the display area.

In a specific embodiment, a user can select by clicking on intro video menu, which will display a sample video related to product. Here users can watch before login or signup. In one embodiment, some sample videos are provided to let users know more about the personal financial planning. In another embodiment, a video explains how to create or manage the personal financial statements in easy manner. In a particular embodiment, clicking video icons causes them to play.

Figure 4:
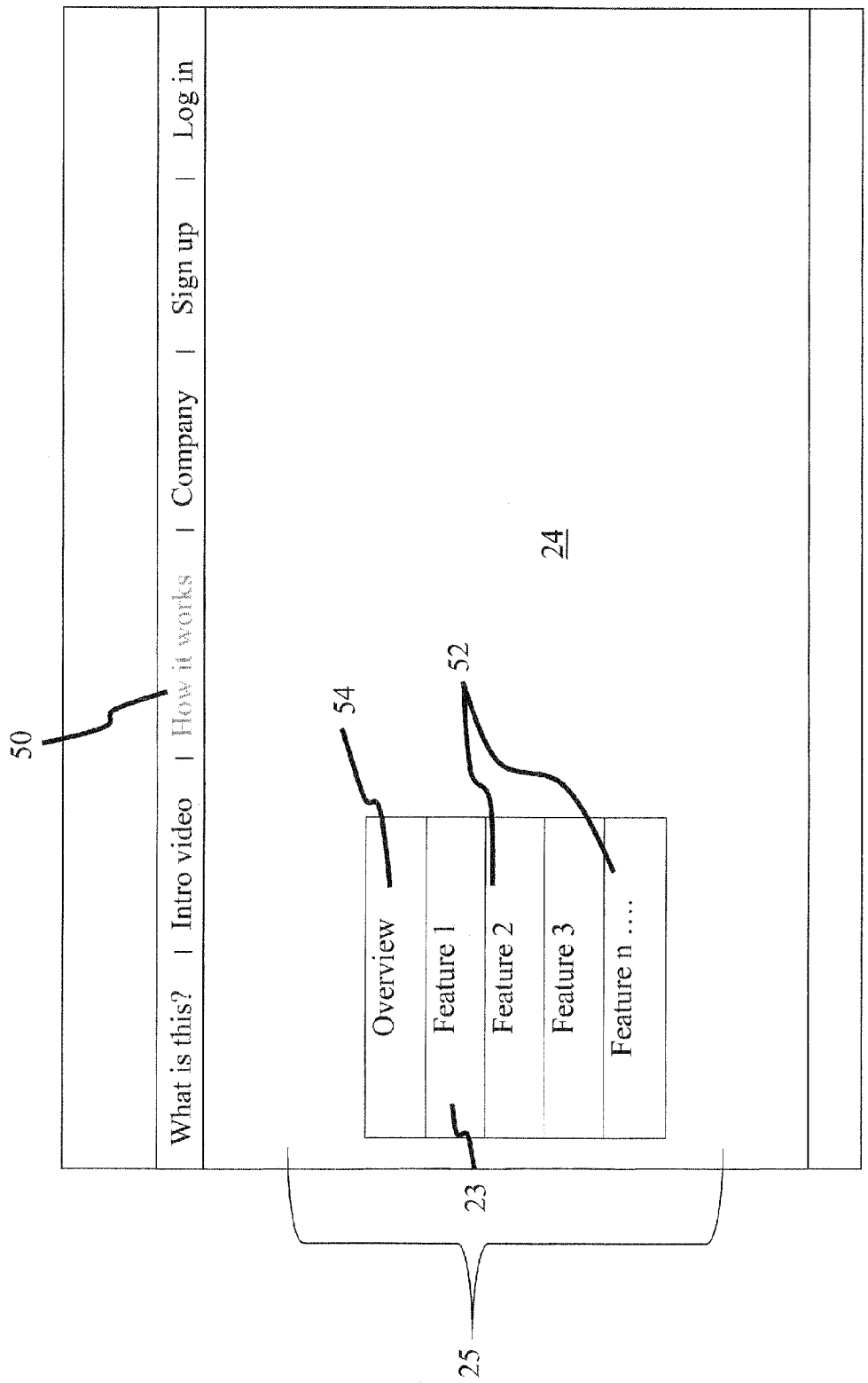
FIG. 4 illustrates an example layout for a "How it works" web page in accordance with an embodiment of the subject invention.
Figure 8:
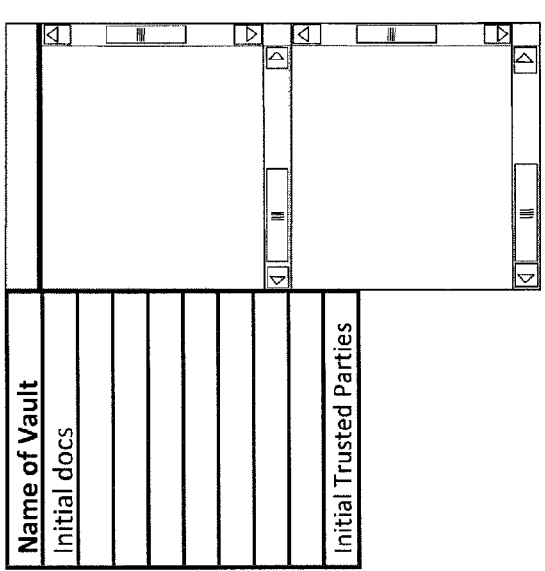
FIG. 8 illustrates an example layout for a "Vault Create form" web page in accordance with an embodiment of the subject invention.

FIG. 4 illustrates an example of a web page showing the results of selecting the "How it works" tab 50 on the home page 20. In one embodiment, a submenu 25 includes one or more activating icons 23 that will be displayed in the display area. Selecting one of the activating icons 23 will provide information associated with that icon. In one embodiment, one or more Feature icons 52 is displayed that when selected will display information about a particular feature of the product. In a further embodiment, an Overview icon 54 can be displayed as part of the submenu 25 in the display area. Selecting this icon can display overview information and explanations about the product and the features of the product.

An example of a web page showing the results of selecting the "Company" tab 60 on the home page 20 can provide information about the company presented within the display area 24. In a further embodiment one or more icons can be displayed in the display area 24. For example, leadership details, news updates about the company, latest events, pictures and/or a list of people associated with the company can be provided.

In a particular embodiment, illustrated in FIG. 4, a submenu 25 can be displayed with various icons that can be selected to obtain particular information. In one embodiment, a "Leadership" icon 62 is presented that, when selected, will display details about the people who are associated with the website or the company. In a further embodiment, a "News updates" icon is presented that, when selected will display the news, events organized, and updates with pictures about the company.

An example of a web page showing the results of selecting the "Sign up" tab 70 on the home page 20 can allow a user to register. In one embodiment, users can register to the site by completing a registration form that will be presented within the display area 24. In a further embodiment one or more icons pertaining to registration can be displayed in the display area 24. In a particular embodiment, a submenu 25 can be displayed with various icons and/or data entry text boxes 27 that can be selected to complete or provide particular information, such as an email address. In a still further embodiment, certain information can be mandatory in order to complete the registration process.

Table I illustrates examples of activation icons that can be included in a submenu, including, but not limited to data entry text boxes 27, mouse over buttons 29 or radio buttons 28 in the display area 24 and example functions:

TABLE I

| Field Name | Mandatory | Type/Action | Validations |
|---|---|---|---|
| Email | yes | Textbox to input | It should accept either text or alphanumeric value, first letter should be text. |
| Confirm email | Yes | Text box to input | It should accept either text or alphanumeric value, first letter should be text. |
| Password | Yes | Text box to input | Allow numeric/alpha numeric |
| Confirm password | Yes | Text box to input | Allow numeric/alpha numeric |
| Submit | No | Button to click | On click it should save the text box values into DB after some validations. |
| Cancel | No | Button to click | On click, it will cleat the text box values and focus will go to first textbox |

An example of a web page showing the results of selecting by clicking the "Log in" tab 80 on the home page 20 can allow a user to login. In one embodiment, users can use this web page and the information thereon to log into the service, once they have completed the registration process. In a further embodiment one or more activation icons 23 can be displayed in the display area 24. In a particular embodiment, a submenu 25 can be displayed with various activation icons 23 that can be selected to obtain or complete particular information. In a still further embodiment, certain information can be mandatory in order to complete the registration process.

Table II illustrates examples of activation icons that can be included in a submenu, including, but not limited to data entry text boxes 27, mouse over buttons 29 or radio buttons 28 in the display area 24 and example functions:

TABLE II

| Field Name | Mandatory | Type/Action | Validations |
|---|---|---|---|
| Email | yes | Text box to input | |
| Password | Yes | text box to input | |
| Remember me | No | Radio/option Button To click | On click It should save the login credential for the next login on same computer |
| Login | Yes | Button to click | On click, it allows to enter into website, if login credential not matched, it should show an error. |
| Cancel | No | Button to click | On click It should clear the text box values and focus goes to first text box |
| Forgot password | No | Clickable link | On click it should take user to recovery password page. |

An embodiment of a Password Recovery web page 100 showing the results of selecting the "Forgot password" icon 86 on the Log-in page 80 can allow a user to input the user's password. The information associated with this webpage is used to assist clients in recovering lost/forgotten passwords. In one embodiment, users can input identifying information into a Password recovery form and complete other identifying information thereon to log into the service, once they have completed the registration process. In a further embodiment, certain information can be mandatory in order to complete the recovery process. In still a further embodiment one or more icons 23 can be displayed in the display area 24.

Table III illustrates examples of activation icons that can be included in a submenu, including, but not limited to data entry text boxes 27, mouse over buttons 29 or radio buttons 28 in the display area 24 and example functions:

TABLE III

| Field Name | Mandatory | Type/Action | Validations |
|---|---|---|---|
| Email | Yes | Textbox to input | It will check whether entered email id is in correct format or not? |
| Send password | Yes | Button to click | It should send the password to users email account, if values entered is not in correct email format, should display an error |

In addition to the above-described tab-associated web pages, additional web pages can be provided under each tab that can allow a client to interact with other aspects or options of the product. Following are embodiments of some additional web pages that can be utilized with the product:

I. Member Home Web Page

An embodiment of a Member Home Page 110, after being logged in, can have following selectable options shown on the screen:

Profile

Docs

Vaults

Trusted Parties

Table IV illustrates examples of activation icons that can be included on this page, such as, for example, in a submenu, including, but not limited to data entry text boxes 27, mouse over buttons 29 or radio buttons 28 in the display area 24 and example functions:

TABLE IV

| Field Name | Mandatory | Type/Action | Validations |
|---|---|---|---|
| Profile | No | Mouseover | It should display the two options 'view profile' and 'update profile'. |
| Docs | No | Mouseover | It should list all the available documents |
| Vaults | No | MouseOver | It should list all the vaults available. |
| Trusted Parties | No | Mouseover | It should list all the trusted parties that a member is having |

II. Profile—View/Update Web Page

A Profile Page 120 can allow a client to make changes, updates, or corrections to their profile. In one embodiment, a mouse over button can be used. In a specific embodiment, using a mouse over button on the Profile button 122, allows one to view his/her profile. Also they can update their profile on selecting update profile option.

Table V illustrates examples of activation icons that can be included on this page such, for example, in a submenu, including, but not limited to data entry text boxes 27, mouse over buttons 29 or radio buttons 28 in the display area 24 and example functions:

TABLE V

| Field Name | Mandatory | Type/Action | Validations |
|---|---|---|---|
| Profile - view profile | No | OnClick | It should display the Member's profile |
| Profile - update profile | No | OnClick | It should open a member profile that can be updated. |

III. Profile—Update Form Web Page

A Profile Update web page 130, upon selection of update profile option, can show a profile update form to allow a client to update/modify his/her profile, which can include name, company, address, and other related profile information.

Table VI illustrates examples of activation icons that can be included on this page, such as, for example, in a submenu, including, but not limited to data entry text boxes 27, mouse over buttons 29 or radio buttons 28 in the display area 24 and example functions:

TABLE VI

| Field Name | Mandatory | Type/Action | Validations |
|---|---|---|---|
| Salutation | Yes | Textbox to input | It will allow choosing salutation from combo box. |
| First Name | Yes | Textbox to input | It should allow to enter the first name of member, should accept alphabetic or alphanumeric |
| Middle Name | Yes | Textbox to input | It should allow to enter the middle name of member, should accept alphabetic or alphanumeric |
| Last Name | Yes | Textbox to input | It should allow to enter the last name of member, should accept alphabetic or alphanumeric |
| ... | ... | ... | ... |
| Update | Yes | Button_Onclick | It will save/update the modified data. |
| Cancel | No | Button_Onclick | It will return to previous screen, |

IV. Docs—Browse Web Page

An embodiment of a Documents Browse Page 140, upon selection of a Does icon 142, can list all documents. Then using the Browse option, one can select a Doc and see a related documents details, such as, but not limited to, when the particular document has been added, who added, whether this document exists in the vaults and who has access to it. Also one can manage these documents, such as adding a document or make them part of an archive.

In a further embodiment, when a client selects the Browse option 144, two sub options will appear:
1. Doc details
2. Manage Upon selecting different Doc details, the following screens will appear with details of particular document with their metadata.

V. Document Details Web Page

An example of a Document Details page 150, which can appear in the display area 24 when a Document Details icon is selected, can display information regarding the selected document, such as who created the document, when the document was added and/or last updated, which vaults the document exists in, and which parties have access to the document.

Table VII illustrates examples of activation icons that can be included on this page, such as, for example, in a submenu, including, but not limited to data entry text boxes 27, mouse over buttons 29 or radio buttons 28 in the display area 24 and example functions:

TABLE VII

| Field Name | Mandatory | Type/Action | Validations |
|---|---|---|---|
| Doc name | yes | — | It should display the document name |
| Added by | yes | — | It should display the added by person name |
| Added on | Yes | — | It should display the added on date. |
| Exist in these vaults | Yes | — | It should display whether the document exists in present vaults in the system |
| Accessed by other parties | Yes | — | It should show the status that whether it can be accessed by other parties. |
| Back | Yes | Button_Onclick | It should take the user to previous screen |

In one embodiment, when selecting, such as by clicking, on Manage option, two sub options will appear.

In one embodiment, a first option is the 'Doc details' explained in relation to the screen above and second is 'Manage' icon, described below. In a further embodiment, using this option either allows a client to select or add a new document or the client can archive a document rather than deleting it. In an embodiment, documents are not deletable, but only archivable.

VI. Personal Financial Statements Web Page

A Personal Financial Statements web page 160 can be provided to the user. In one embodiment, on selection of Personal Financial Statements (PFS) on this page, all PFS will be listed. In a further embodiment, by using Browse option which appears, one can see the PFS details. Also one can create a new PFS by filling in a new PFS form. In a specific embodiment, one or more mouse over buttons 29 can be used to select a particular PFS. The mouse over button can then activate a drop-down menu that can provide options, such as, but not limited to, browse the PFS or create a new one.

In one embodiment, when using a mouse over button on any PFS icon, two options will be shown and on selecting, such as, for example, by clicking, on 'Browse' sub option, a screen, such as shown, for example, in FIG. 16, will display with Personal Financial statement detail page 170, for a PFS which has been selected. On clicking on 'Create' sub option, create new PFS form page, a PFS Details page, such as shown, for example, in FIG. 16, will open and user can enter all details in it. In one embodiment, it can be either joint or individual PFS, which means more than one person can have access to a PFS.

Whenever a client selects, such as by clicking the Submit/Create button of the PFS form, entered data will be saved to DB, and will be saved as a PDF file as well.

Table VIII illustrates examples of activation icons that can be included on this page, such as, for example, in a submenu, including, but not limited to data entry text boxes 27, mouse over buttons 29 or radio buttons 28 in the display area 24 and example functions

TABLE VIII

| Field Name | Mandatory | Type/Action | Validations |
|---|---|---|---|
| Back | Yes | Button_Onclick | It should take user to previous screen. |

FIG. 6 shows an example of a Personal Financial statement form web page 180.

Table IX illustrates examples of activation icons that can be included on this page, such as, for example, in a submenu, including, but not limited to data entry text boxes 27, mouse over buttons 29 or radio buttons 28 in the display area 24 and example functions:

TABLE IX

| Field Name | Mandatory | Type/Action | Validations |
|---|---|---|---|
| Name | Yes | Textbox to input | It will allow user to enter alphabetic or alphanumeric values |
| Date | Yes | Textbox to input | It should allow user to enter date in prescribed format |
| Create | Yes | Button_Onclick | It will save the entered data to create a new PFS |
| Cancel | No | Button_Onclick | It will take the user to previous screen. |

Different fields will allow user to enter values to fill in new PFS form

VII. Vaults—Vault List

On selecting, such as by clicking, on 'Vaults' option it will display a vault list web page, which exists in the system. On selecting, such as by a mouseover, on any vaults it can show two sub options:

1. Default Vaults
2. Browse
3. Create

A web page can be provided to the user for selecting different vaults.

Table X illustrates examples of activation icons that can be included on this page, such as, for example, in a submenu, including, but not limited to data entry text boxes 27, mouse over buttons 29 or radio buttons 28 in the display area 24 and example functions:

TABLE X

| Field Name | Mandatory | Type/Action | Validations |
|---|---|---|---|
| Vault1 | No | Mouseover | It should display the clickable options, Browse & Create. |
| Vault2 | No | Mouseover | It should display the clickable options, Browse & Create |
| Vault . . . n | No | MouseOver | It should display the clickable options, Browse & Create |

VIII. Vaults—Vault Detail—Browse—Doc Detail Page

On selecting, such as by clicking, on 'Vaults—Browse—Vault Details' option, there can display the vault documents details web page 200. Information regarding a document can include, for example, metadata such as a date the document was added, who the document was added by, any tags, and/or access history information such as name of individual or entity that have accessed the document, the time and date of the access, and the title of the document. This web page can include the following options.

Browse—ability to display the doc details under that vault
Add new Vault—Ability to add new vault
Vault email address—shows email address of particular vault
Trusted Parties—list of trusted parties related to particular vaults
Manage—ability to show how to manage the vaults Table XI illustrates examples of activation icons that can be included on this page, such as, for example, in a submenu, including, but not limited to data entry text boxes 27, mouse over buttons 29 or radio buttons 28 in the display area 24 and example functions:

TABLE XI

| Field Name | Mandatory | Type/Action | Validations |
|---|---|---|---|
| Doc details | yes | onLoad | |
| Remove this doc | No | Button_Onclick | On click, it will remove the existing document, whose details are listed. |

IX. Vaults—Default Vaults Page

On selecting, such as by clicking, on 'Vaults—Default Vaults' option, there can be displayed the default vaults details web page 210, such as shown, for example, in FIG. 20.

Table XII illustrates examples of activation icons that can be included on this page, such as, for example, in a submenu, including, but not limited to data entry text boxes 27, mouse over buttons 29 or radio buttons 28 in the display area 24 and example functions

TABLE XII

| Field Name | Mandatory | Type/Action | Validations |
|---|---|---|---|
| Back to Vault Details | Yes | Button_Onclick | On click, it will take user to vaults detail page. |

X. Vaults—Vault Detail—Manage

On selecting, such as by clicking on 'Vaults—Vaults—Manage' option, there can be displayed the following four options that a client can use to manage the vaults:

Grant—ability to add access to friends/family/relatives
Archive—Archiving the Vault rather than delete
Invite—Invite people to join the vaults Notifications—ability to send Notifications to trusted parties On selection of Grant option, there will open a grant form web page 220. The grant form page can allow for entry of an email address, permissions granted, such as read only, add to, and/or remove form, and an expiration date for the granted access.

Table XII illustrates examples of activation icons that can be included on this page, such as, for example, in a submenu, including, but not limited to data entry text boxes 27, mouse over buttons 29 or radio buttons 28 in the display area 24 and example functions

TABLE XIII

| Field Name | Mandatory | Type/Action | Validations |
| --- | --- | --- | --- |
| Email | yes | Text box_Input | It allows entering email, if it is not in email address format, it will not accept the value. |
| Permission - Read | Yes | ComboBox_Selection | It allows to select yes/no values |
| Permission - Add | Yes | ComboBox_Selection | It allows to select yes/no values |
| Permission - Remove | Yes | ComboBox_Selection | It allows to select yes/no values |
| Save | Yes | Button_Onclick | It saves the grant from data to DB. |
| Back | No | Button_Onclick | It takes the user to back page where they were earlier. |

On selection of a Notifications option, there will open a Notification form web page 230, which can allow entry of when to notify trusted parties, such as never, whenever documents are added, whenever documents are removed, and/or other options.

Table XIV illustrates examples of activation icons that can be included on this page, such as, for example, in a submenu, including, but not limited to data entry text boxes 27, mouse over buttons 29 or radio buttons 28 in the display area 24 and example functions

TABLE XIV

| Field Name | Mandatory | Type/Action | Validations |
| --- | --- | --- | --- |
| Never | Yes | ComboBox_Selection | It allows user to select the values yes/no for Notifications, |
| Whenever docs are added | Yes | ComboBox_Selection | It allows user to select the values yes/no for Notifications, |
| Whenever docs are removed | Yes | ComboBox_Selection | It allows user to select the values yes/no for Notifications, |
| Save | Yes | Button_Onclick | It saves the grant from data to DB. |
| Back | No | Button_Onclick | It takes the user to back page where they were earlier. |

XI. Vaults—Vault Create Form

On selecting, such as by clicking, on 'Vaults—Create Form' option it will display a Vault Create form web page 240, used to create a new vault and ask for document and trusted parties, such as shown, for example, in FIG. 6.

Table XV illustrates examples of activation icons that can be included on this page, such as, for example, in a submenu, including, but not limited to data entry text boxes 27, mouse over buttons 29 or radio buttons 28 in the display area 24 and example functions

TABLE XV

| Field Name | Mandatory | Type/Action | Validations |
| --- | --- | --- | --- |
| Name of vault | yes | Text box_Input | — |
| Initial docs | Yes | Multiline textbox input | It should allow more than one line input while creating a new vault using existing docs which are stored on hard disk |
| Initial trusted parties | Yes | Multiline textbox input | It should allow more than one line input - user can add the trusted parties details either they exist in system or can add new one |
| Create | Yes | Button_Onclick | It saves the new vault details data to DB. |
| Back | No | Button_Onclick | It takes the user to back page where they were earlier. |

XII. Members Home—Trusted Parties

On selecting, such as by clicking, on a 'Members home—Trusted parties' option, there will display the trusted parties list web page 250, which shows a list of individuals added/exists in system for the user who logged in.

Table XVI illustrates examples of activation icons that can be included on this page, such as, for example, in a submenu, including, but not limited to data entry text boxes 27, mouse over buttons 29 or radio buttons 28 in the display area 24 and example functions

TABLE XVI

| Field Name | Mandatory | Type/Action | Validations |
| --- | --- | --- | --- |
| Trusted parties | No | Mouseover | It should allow user to check all the trusted parties list exist in the system for the particular user. |
| Trusted party 1 | Yes | Mouseover | It should allow user to show the 'Browse' & 'Manage' options to user so the user can get trusted party details and manage them. |
| Trusted party 2 | Yes | Mouseover | It should allow user to show the 'Browse' & 'Manage' options to user so the user can get trusted party details and manage them. |
| Trusted party 3 | Yes | Mouseover | It should allow user to show the 'Browse' & 'Manage' options to user so the user can get trusted party details and manage them. |
| Trusted party . . . n | Yes | Mouseover | It should allow user to show the 'Browse' & 'Manage' options to user so the user can get trusted party details and manage them. |

XIII. Members Home—Trusted Parties—Browse—Trusted Parties Details

On selecting, such as by clicking, on 'Trusted parties—Browse' option, there will display the particular trusted party details web page 260, which can show details such as the trusted parties' names, company, relationship to client, date added, and/or other information.

Table XVII illustrates examples of activation icons that can be included on this page, such as, for example, in a submenu, including, but not limited to data entry text boxes 27, mouse over buttons 29 or radio buttons 28 in the display area 24 and example functions

TABLE XVII

| Field Name | Mandatory | Type/Action | Validations |
|---|---|---|---|
| Back | No | Button_Onclick | It takes the user to back page where they were earlier. |

XIV. Members Home—Trusted Parties—Manage—Grant Form

On selecting, such as by clicking, on 'Trusted Parties—Manage' option, there can be displayed options such as the three options:
Grant
Invite
Remove In one embodiment, on selecting, such as by clicking, the 'Grant' option, there will open a grant form web page, where a client can fill the friends/family members/relative's details, whom they want to grant the access to for this PFS. The granted access can be for read, adding, and/or removing documents and/or information, and can include a time limit, a time period, and/or an expiration date for such access.

In one embodiment, on selecting, such as by clicking the 'Invite' option, the client will be asked the email ID for the friends/family members/relative's whom client can invite to grant access for a PFS.

In one embodiment, on selecting, such as by clicking on 'Remove' option, a client will have the ability to remove the grant for particular trusted parties for his PFS.

Table XVIII illustrates examples of activation icons that can be included on this page, such as, for example, in a submenu, including, but not limited to data entry text boxes 27, mouse over buttons 29 or radio buttons 28 in the display area 24 and example functions

TABLE XVIII

| Field Name | Mandatory | Type/Action | Validations |
|---|---|---|---|
| Email | yes | Text box_Input | It allows entering email, if it is not in email address format, it will not accept the value. |
| Permission - Read | Yes | ComboBox_Selection | It allows to select yes/no values |
| Permission - Add | Yes | ComboBox_Selection | It allows to select yes/no values |
| Permission - Remove | Yes | ComboBox_Selection | It allows to select yes/no values |
| Expiration date | Yes | Date field | It allows the user to set the granted access expiration date for particular person. |
| Save | Yes | Button_Onclick | It saves the grant from data to DB. |
| Back | No | Button_Onclick | It takes the user to back page where they were earlier. |

Figure 9:
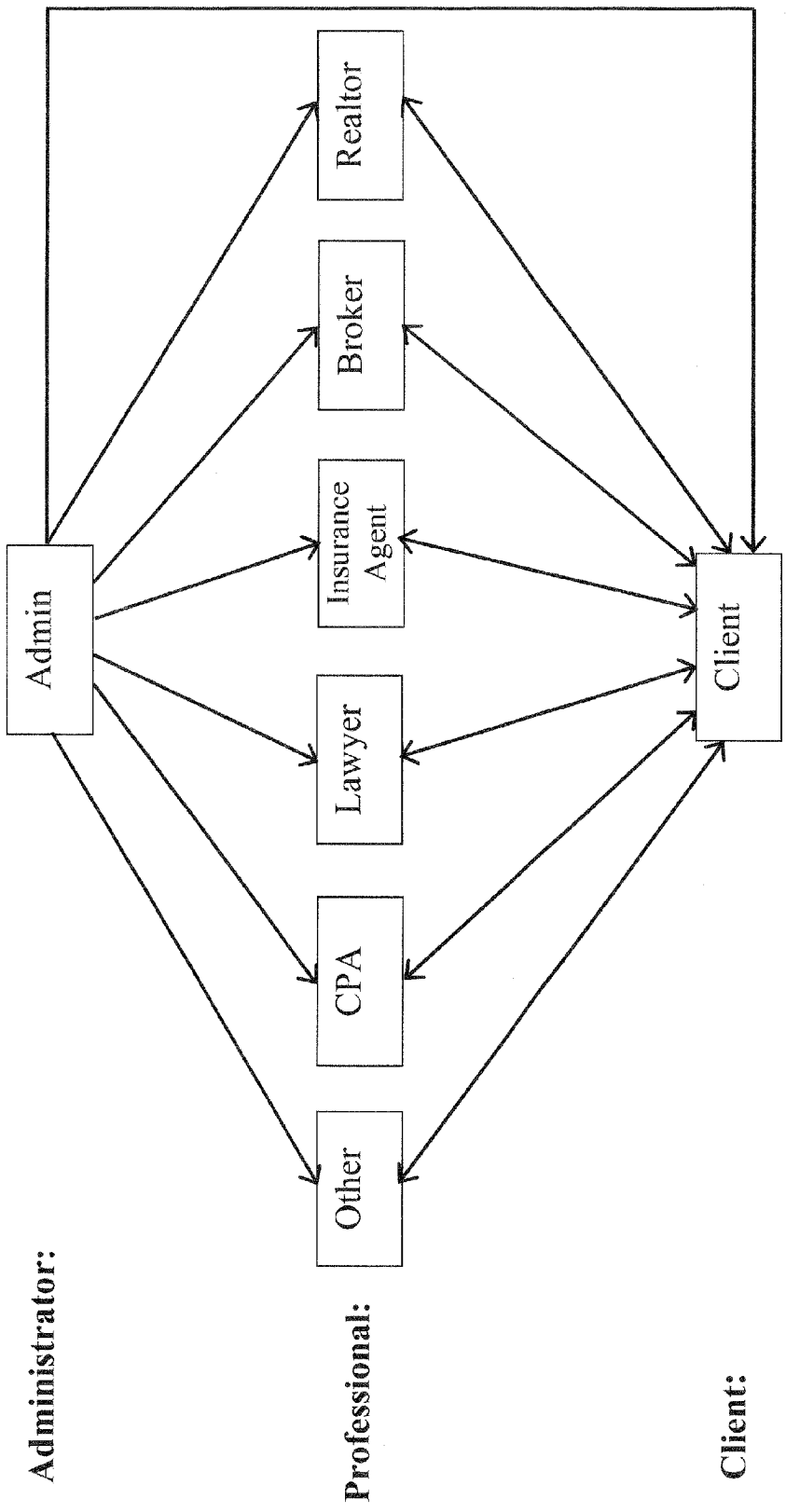
FIG. 9 illustrates the interactions between individuals and/or entities with respect to an embodiment of the subject invention.

FIG. 9 shows the user levels that can be implemented by a specific embodiment. An administrator can have power to interact with professionals, such as create and/or delete a professional, and can have the power to interact with the client, such as to create and/or delete a client. Professionals can be, for example, one of several categories of professional, such as a CPA, banker (not shown), lawyer, insurance agent, financial advisor (not shown), broker, realtor, or other. In this embodiment, all professionals have the same powers. In alternative embodiments, multiple classes of professionals can be created, each class with a specific set of powers. areas an example, CPA's that are trusted can be given access to financial documents, but not other documents. Likewise, lawyers that are trusted can be given access to legal documents and not other documents. Such differentiated powers can also be applied to insurance agents, brokers, realtors, bankers, and/or other sorts of professionals. In a further specific embodiment, documents can be categorized and each profession can selectively be given access to documents under each category. As an example, a certain professional could be given access to financial, and tax documents, but not to insurance, brokerage, real estate, or other documents, while other professionals have different permutations of access. The third user level is the client. The administrator has power over the professionals and the client, indicated by the one-way arrows. The professionals and the client have a two-way relationship, shown by double headed arrows, where the professional can take actions on behalf of the client, such as upload files and change personal information, and the client can take actions affecting the professionals, such as add one or more permissions. Accordingly, FIG. 9 shows how multiple professionals, such as CPA's and bankers, can be connected through the client. The client can create a trusted relationship with the CPA, and create a trusted relationship with the banker, and then the CPA and the banker have a mediated relationship through the client.

Figure 10A:
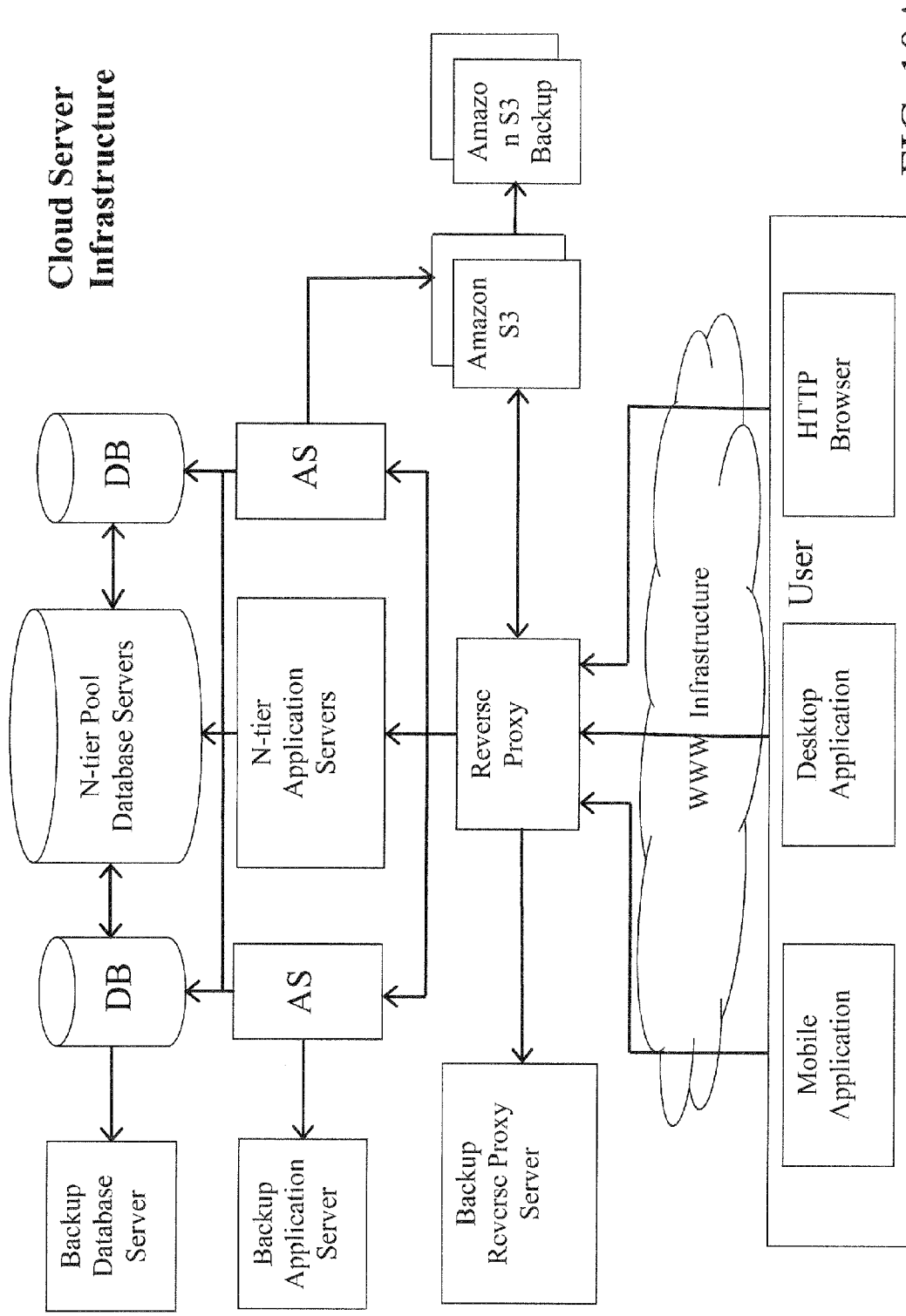
FIG. 10A shows a schematic of a system utilizing a cloud server infrastructure with respect to an embodiment of the subject invention.

Referring to FIG. 10A, in a specific embodiment, the primary server infrastructure is a cloud infrastructure. The bottom of FIG. 10A shows various ways the user can interact with the system, such as an HTTP browser, a web browser, a desktop application, and a mobile, phone, or tablet application. The HTTP browsers, other applications, or other user interface that the user interfaces with connects through World Wide Web infrastructure to a reverse proxy. The reverse proxy then connects to an N-tier application server. There can be as many application servers as are necessary. The reverse proxy performs load balancing and sending files to the appropriate application servers as needed. Then, actions that need to be taken on the application servers may involve querying the databases. When such queries occur, these application servers, as shown by the arrow to the right, fire off to the Amazon S3. As an example, the application server can put cached requests over in Amazon S3 or keep cached requests on the application server. Databases can be pooled across each other in replication. There is also, on all levels, the stack from the database server, the application server, and the reverse proxy. To the left, there are backups being done for the different server configurations. The application server writes to Amazon S3, which can be files uploaded from the user, cache, and/or different assets. Amazon S3 is also shown to be backed up to an Amazon S3 backup, and Amazon S3 can serve many of the files straight to the reverse proxy, so that for many actions, if the data or files are cached, the action has been done before, the application or database servers may not need to be involved.

Figure 10B:
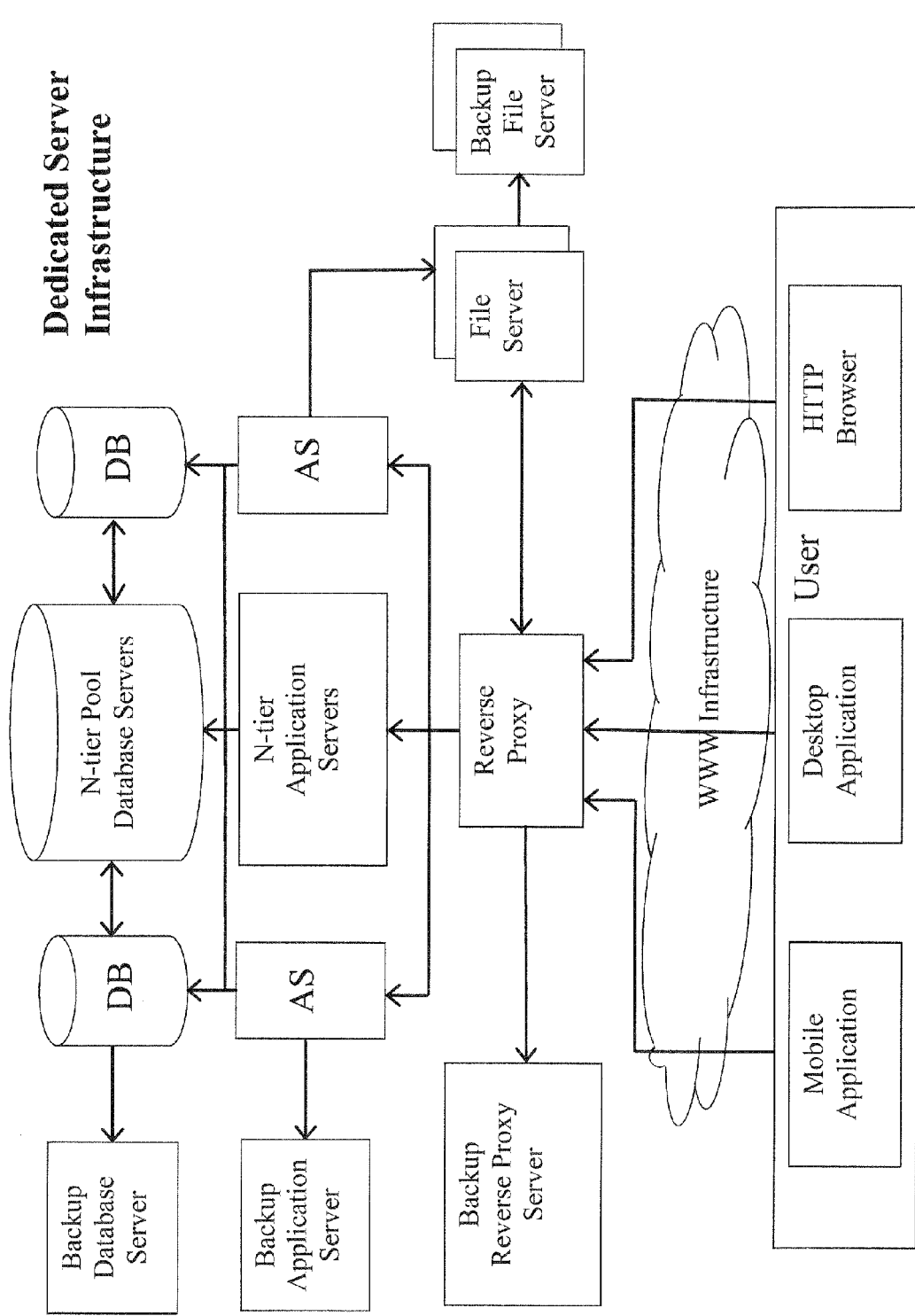
FIG. 10B shows a schematic of a system utilizing a dedicated server infrastructure with respect to an embodiment of the subject invention.

FIG. 10B shows an embodiment similar to the embodiment of FIG. 10A, utilizing dedicated servers instead of cloud servers. The same stack is used as was used in FIG. 10A, of reverse proxy, N application servers, database servers, and the stack is in the same general configuration, with dedicated hardware replacing the cloud hardware. A dedicated server infrastructure can be used, for example, when a company wants to run in-house or behind whatever firewall they desire, as the Amazon S3 is replaced with a dedicated file server with its own backup file server.

Figure 11:
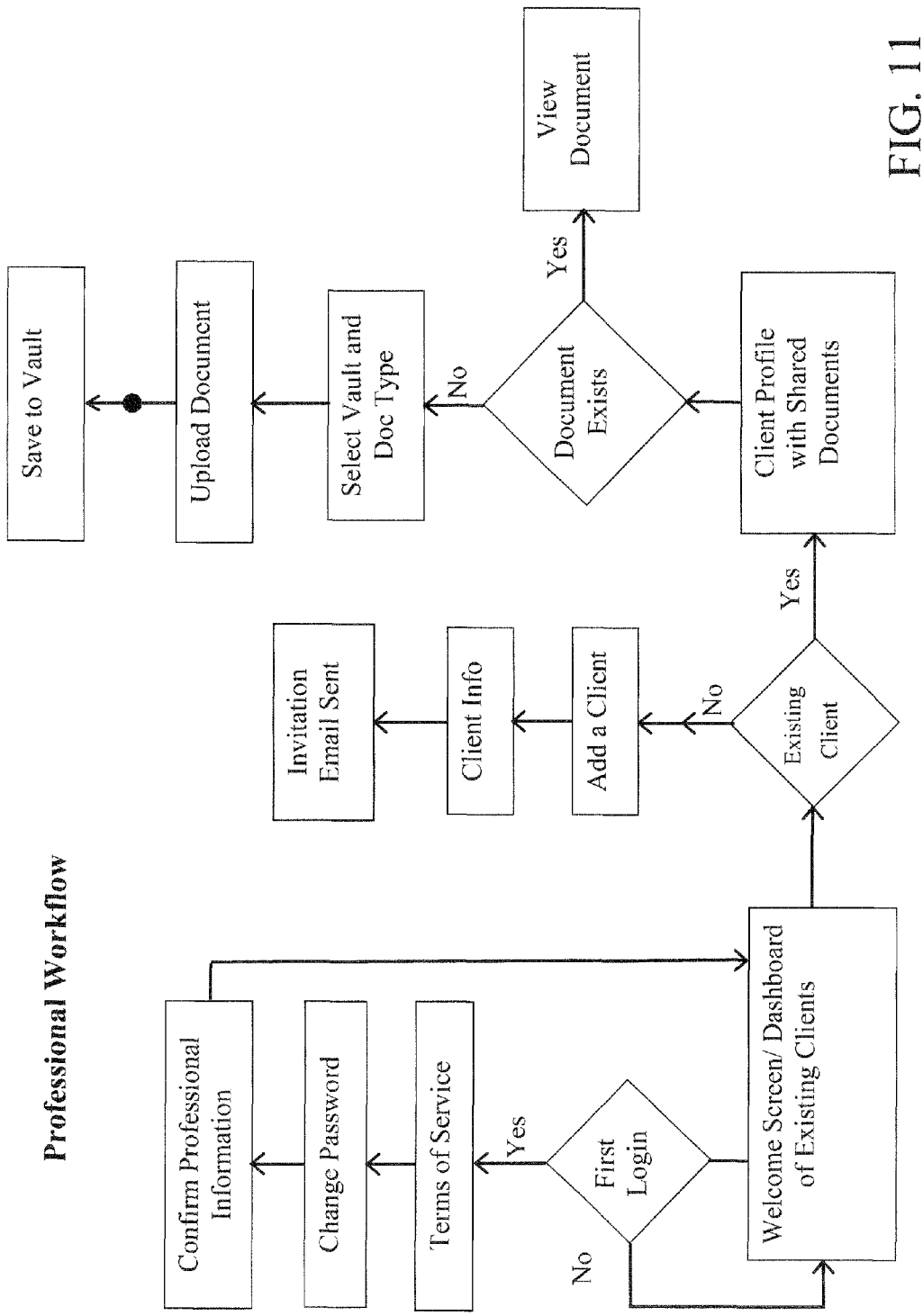
FIG. 11 shows a workflow for a professional interacting with a system in accordance with an embodiment of the subject invention.

FIG. 11 shows a flow chart for the professional workflow, which shows how a professional interacts with the system. At the bottom left of FIG. 11, a welcome screen or dashboard of existing clients is shown to the professional after logging on. The professional dashboard can show a list of clients with email links and a field showing whether client is active, and can have a tab for adding a client and a tab for downloading a basic document. If it is the first login, the professional has to agree to a terms of service, change his/her password, which is temporarily set by the administrator when the administrator sets up the account for the professional. The professional has to confirm information, in the example of a CPA this might be his/her firm's information, addresses, phone numbers, and signature, which would be used in other parts of the work flow. After the confirmations, the system takes them back to the dashboard of existing clients. If the professional wants to add a client, the professional can do so on this screen. The client contact information can be entered. In an embodiment, the client's email address is required. Once the client has been added and the client's contact information entered, an invitation email, or other form of invitation, is sent to the client, offering to create an account and have a trusted relationship with the professional who is requesting to add the client. Referring back to FIG. 11, if the professional has an existing customer, then the professional can click on that client and go to a client profile, which shows the client's shared documents. seethe client profile shows the documents that are shared with the professional. The client can have other documents that are not shared with the professional that logged in, but the logged-in professional is only shown the documents that are shared with the professional that is logged in.

If the document exists, the professional can click on, and view, the document. Certain information about the document is shown. The encrypted version can be retrieved. The finalized document can be viewed, as well as other details not indicated in FIG. 11, and the professional can input comments regarding the document. about the document can be encrypted and the creation of, viewing of, amending of, the document can be time stamped. The professional can also see what other professionals have access to this document, as well as who uploaded this document and when. For example, the document may have been uploaded by the client, or uploaded by this or another professional on behalf of the client. This can be very important for the audit trail, so it is clear exactly who uploaded the file and when and/or who viewed and/or amended the file or document.

Referring back to FIG. 11, the client profile, if the document does not exist, the professional can add document. The professional can click a tab for adding a document. Further, the professional can select one of the vaults the document is going to go into, and some other options for some meta. The professional then chooses a file or document type. The professional saves changes, and uploads the document. Encryption of the document can occur upon loading the document, and the document can be placed into Amazon S3 or other server. In this way, only the client has access to that the document, as well as professionals with a trusted relationship to this specific client, who have access through the client. When the professional requests the document, the system checks who (which client) owns this document, and checks whether the professional requesting the document has a trusted relationship with the client who owns the document. If the professional has a trusted relationship, the professional can see the document, and, if not, the professional cannot see the document. In further embodiments, the professional may not be able to see all of the client's documents even though the professional is in a trusted relationship, but, rather, the professional is only able to see documents that are of a type the professional has been granted access to, such as legal versus financial, or specific documents for which the professional has been granted access.

Figure 12:
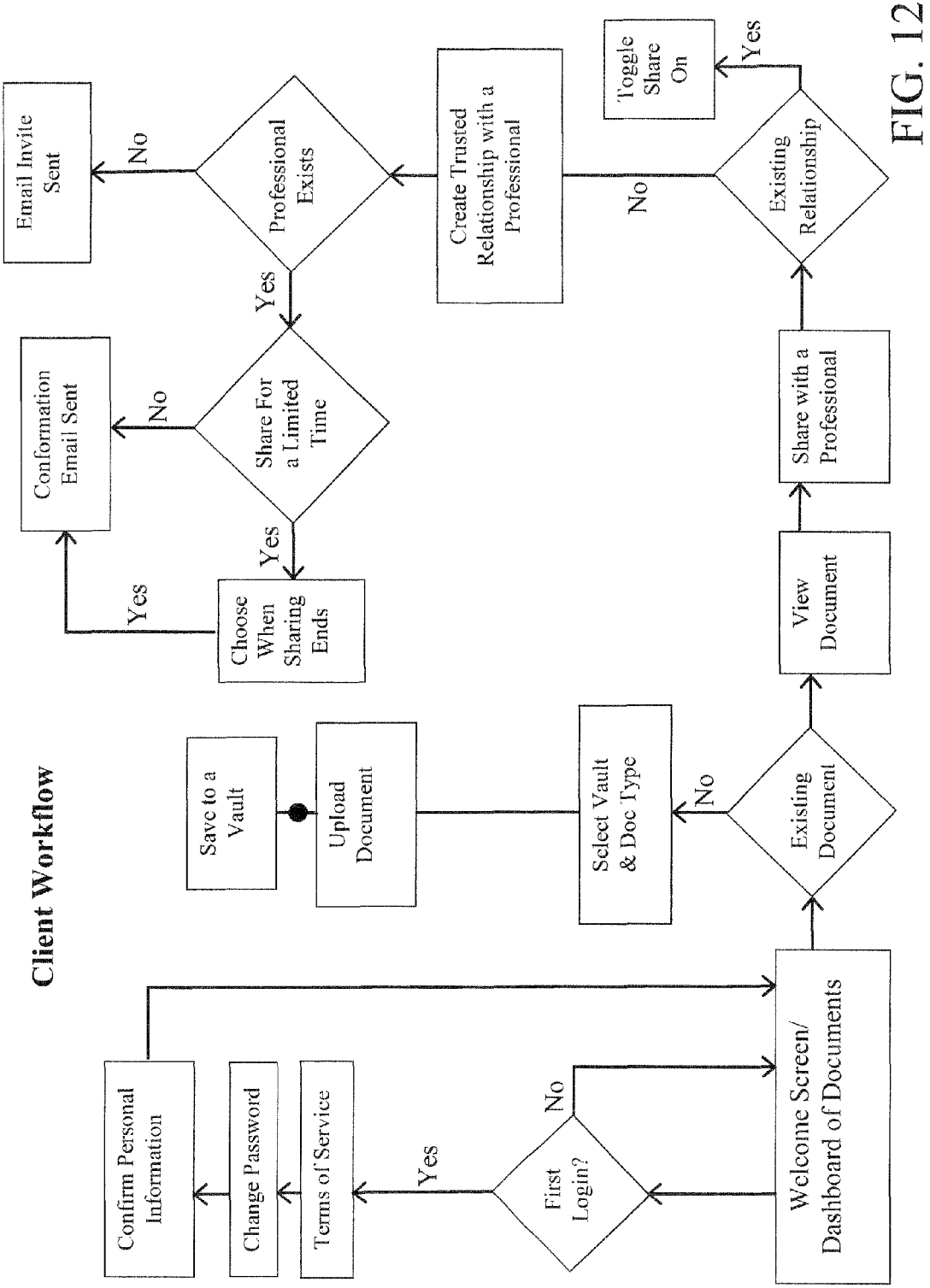
FIG. 12 shows a workflow for a client interacting with a system in accordance with an embodiment of the subject invention.

Referring to FIG. 12, a flow chart for a client login is shown. After login, the client goes to a welcome screen. The client follows a similar path to the professional when it is a first login, namely, create terms of service, change password, and confirm personal information. Once the client logs in, the client is brought back to the welcome screen. The client is shown the existing documents and can click on one to view it. The client can also share the document with a professional. A list of professionals can be shown to the client, broken down into a list of professionals that the client has a trusted relationship with and a list of other professionals in the system that the client does not currently have a trusted relationship. with. These professionals that do not have a trusted relationship with the client do not have access to the document. If the client wants to share, or create a trusted relationship, with a specific professional who does not currently have a trusted relationship with the client, the client can click the share button. Once the client clicks the share button, the professional is shown as having a trusted relationship with the client. The client then has the option to unshared with this professional, or any other professional the client has a trusted relationship with.

Referring again to FIG. 12, if a client wants to share a document with a professional, and the professional has a trusted relationship with the client, the client can click the share button and it toggles the share on. If there is not an existing trusted relationship with the professional, the client can create a trusted relationship by utilizing the manage relationships screen, which shows other professionals in the system that the client does not yet have a trusted relationship with. If the professional who the client wants to share the document with is not in the system, to the client can prompt an invitation to be sent to the professional, for example via email. In another embodiment, clients can onboard a professional to the system. In the embodiment shown in FIGS. 11 and 12, only professionals can onboard clients, and administrators have to onboard professionals.

In an embodiment, if the client wants to share one or more documents with a professional for a limited time, because there is a specific type of a transaction or other reason, such as there is a real estate deal and the client wants to remove the documents after it closes or wants to remove access to the realtor, the access by the professional can be limited in time. The limitations in time can be, for example, until a certain date, no access after a certain date, and/or access only for a certain amount of time. When the client creates the trusted relationship, an ability can be provided for the client to add a time constraint to the access, and the access based on the trusted relationship will automatically be removed at the appropriate time. An email, or other communication can be sent to the professional indicating Client X has shared this document with you, and asking the professional to accept the relationship. When the client chooses to share for a limited amount of time, an option to choose when the sharing will end, and to confirm it, can be provided to the client, and then a confirmation email, or other communication can be sent to the client.

Referring again to FIG. 12, from the welcome screen the client can select an existing document. Further, at the welcome screen, when there is not an existing document, the client can add a document. The client selects the vault the document will go in by indicating what type of vault, and/or selecting a specific vault. The client chooses a file or document and hits the upload button. The encryption of the document occurs and the system saves the document to the vault, which can be in Amazon S3 in the client infrastructure (FIG. 10A), or in the dedicated file servers in the dedicated infrastructure version (FIG. 10B).

Figure 13:
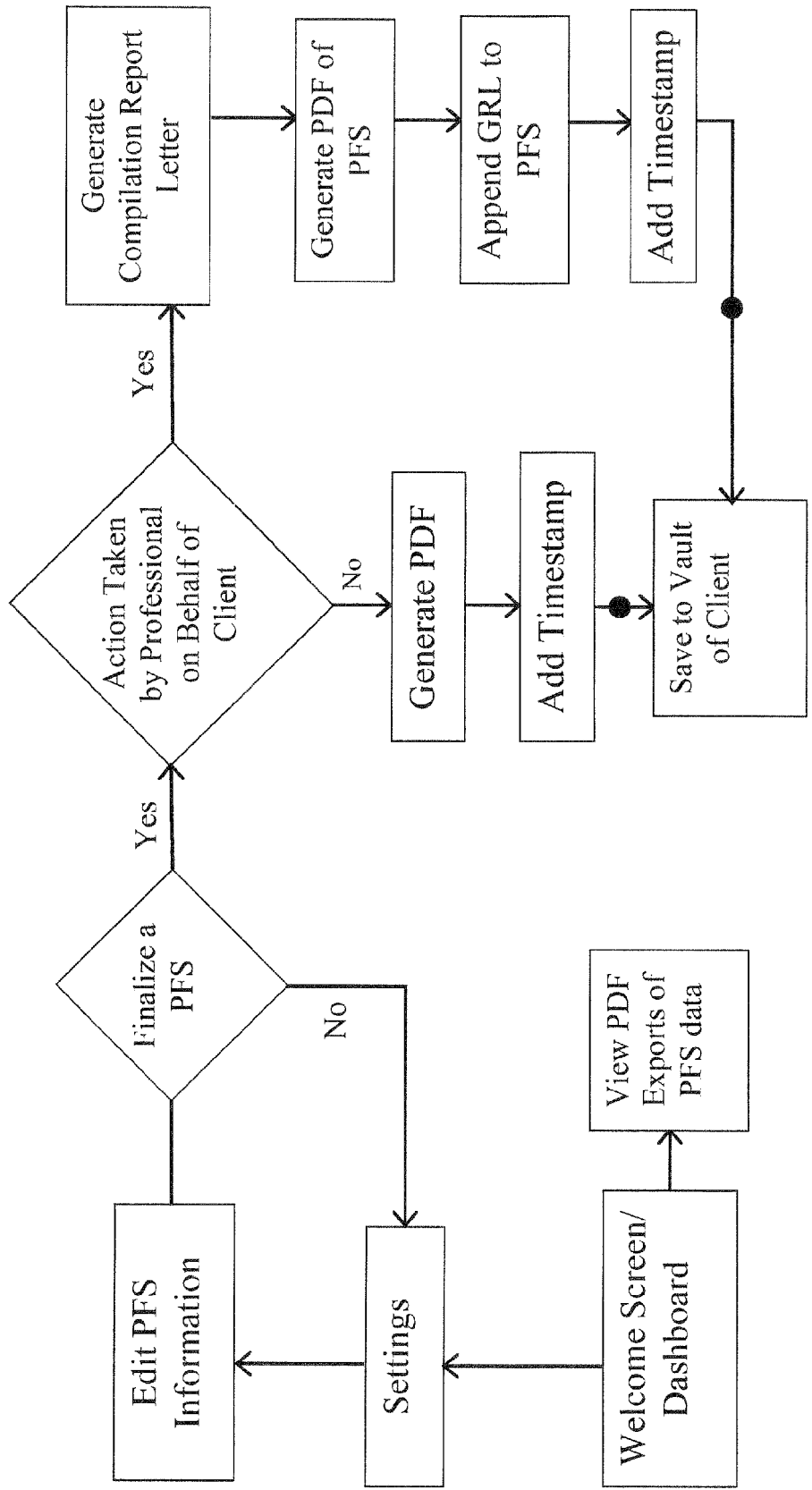
FIG. 13 shows a Personal Financial Statement workflow with respect to an embodiment of the subject invention.

Referring to FIG. 13, a flow chart is shown for saving a personal financial statement to a vault. The welcome screen for the client or professional is to the lower left. From the welcome screen, the client can view a PDF that is an exported personal financial statement. The welcome screen can shown a tab for a vault that is labeled financial statements, and the client can click on the tab, and view the personal financial statement. The documents can be stored as encrypted PDF's, or in another desired format. If the client wants to edit some information, to the client can go to settings, and there is a button for editing personal financial information, such as information that goes on a personal financial statement. Form fields can be provided to the client for entering information. Schedules can also be provided and calculations can be performed by the system, so the client does not actually have to create the entire personal financial statement from hand or use Excel to do the calculations, as the system calculates much of the numbers from the numbers entered into the forms. The client can update whatever the client wishes to update and add or edit any information the client wishes. The client can then choose to finalize a personal financial statement, which creates a PDF version that is time stamped, and saved to a vault, as shown in FIG. 13. If the client is not ready to finalize the personal financial statement then the client can go back to the settings, or home. A button can be on the personal financial statement screen that can allow the client to choose to finalize the personal financial statement. The client can also go to add a document, at the vault, and can put information into the client's personal financial statement. The client can create a financial statement for personal or for a business entity.

Referring to FIG. 13, at the top middle, if the action is being taken by a professional on behalf of the client, then the professional goes to generate a compilation report letter. When the client creates the PDF of the personal financial statement, the system takes all the database fields for the personal financial statement and generates a PDF. A time stamp is added into the system and an indication that it was the client that generated the personal financial statement, and what time it was uploaded. In specific embodiments, encryption is performed and the personal financial statement is put it into, for example, the Amazon S3 or proprietary server and then saved into the vault.

Again, if a professional is logged in, the professional goes to the particular client, and adds the document for the client just as discussed before, and the professional then chooses the financial statements, personal or business. The professional can then edit the personal financial statement of the client (see right side of FIG. 13). The professional can edit the personal financial statement on behalf of the client and select the tab to finalize the personal financial statement. If the action is taken by the professional, then the system generates a compilation report letter. This is a letter that can have the professional's name and/or the professional's firm's name on the letter, and can have an image of the professional's signature. The letter can have other indications that the personal financial statement was created by a CPA or other professional. The system can create a letter that meets various CPA industry specific standards. The compilation report letter is generated and a PDF of the personal financial statement is generated. The system can then append the compilation report letter, or prepend the compilation report letter to the personal financial statement, so that both of these documents are now one PDF. The system can add a time stamp to the PDF, the PDF can be encrypted, the encrypted PDF can then be saved into the vault of the client. The professional can do all of this on behalf of the client. When the professional generates the personal financial statement on behalf of a client, this special compilation report letter is prepended to the PDF, the time stamp information is performed, and the PDF is stored in the client's vault.

Aspects of the invention, such as creating, storing, sharing, and organizing a DSDB can be described in the general context of computer-executable instructions, such as program modules, being executed by a computer. Generally, program modules include routines, programs, objects, components, data structures, etc., that perform particular tasks or implement particular abstract data types. Such program modules can be implemented with hardware components, software components, or a combination thereof. Moreover, those skilled in the art will appreciate that the invention can be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, formats, and numerous other details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention can be practiced without these specific details. Computer systems, servers, work stations, and other machines can be connected to one another across a communication medium including, for example, a network or networks.

As one skilled in the art will appreciate, embodiments of the present invention can be embodied as, among other things—a method, system, or computer-program product. Accordingly, the embodiments can take the form of a hardware embodiment, a software embodiment, or an embodiment combining software and hardware. In an embodiment, the present invention takes the form of a computer-program product that includes computer-useable instructions embodied on one or more computer-readable media. Methods, data structures, interfaces, and other aspects of the invention described above can be embodied in such a computer-program product.

Computer-readable media include both volatile and nonvolatile media, removable and nonremovable media, and contemplate media readable by a database, a switch, and various other network devices. By way of example, and not limitation, computer-readable media incorporate media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. In an embodiment, non-transitory media are used.

The invention can be practiced in distributed-computing environments where tasks are performed by remote-processing devices that are linked through a communications network or other communication medium. In a distributed-computing environment, program modules can be located in both local and remote computer-storage media including memory storage devices. The computer-useable instructions fowl an interface to allow a computer to react according to a source of input. The instructions cooperate with other code segments or modules to initiate a variety of tasks in response to data received in conjunction with the source of the received data.

The present invention can be practiced in a network environment such as a communications network. Such networks are widely used to connect various types of network elements, such as routers, servers, gateways, and so forth. Further, the invention can be practiced in a multi-network environment having various, connected public and/or private networks.

Communication between network elements can be wireless or wireline (wired). As will be appreciated by those skilled in the art, communication networks can take several different forms and can use several different communication protocols.

Embodiments of the subject invention can be embodied in a processing system. Components of the processing system can be housed on a single computer or distributed across a network as is known in the art. In an embodiment, components of the processing system are distributed on computer-readable media. In an embodiment, a user can access the processing system via a client device. In an embodiment, some of the functions or the processing system can be stored and/or executed on such a device. Such devices can take any of a variety of forms. By way of example, a client device may be a desktop, laptop, or tablet computer, a personal digital assistant (PDA), an MP3 player, a communication device such as a telephone, pager, email reader, or text messaging device, or any combination of these or other devices. In an embodiment, a client device can connect to the processing system via a network. As discussed above, the client device may communicate with the network using various access technologies, both wireless and wireline. Moreover, the client device may include one or more input and output interfaces that support user access to the processing system. Such user interfaces can further include various input and output devices which facilitate entry of information by the user or presentation of information to the user. Such input and output devices can include, but are not limited to, a mouse, touchpad, touch-screen, or other pointing device, a keyboard, a camera, a monitor, a microphone, a speaker, a printer, a scanner, among other such devices. As further discussed above, the client devices can support various styles and types of client applications.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A method of storing and controlling access to electronic documents, comprising:
    providing a system having an interface and an electronic storage element,
    wherein a client has access via the interface to add electronic documents to be associated with the client and stored in the electronic storage element,
    wherein persons and entities other than the client are allowed access via the interface to add electronic documents to be associated with the client and stored in the electronic storage element when control information specifying the persons and entities, and access via the interface to add electronic elements to be associated with the client and stored in the electronic storage element, is input via the interface,
    wherein the client has access via the interface to
        (i) view electronic documents associated with the client and stored in the electronic storage element,
        (ii) edit electronic documents associated with the client and stored in the electronic storage element, and
        (iii) remove electronic documents associated with the client and stored in the electronic storage element,
    wherein persons and entities other than the client are allowed one or more types of access via the interface with respect to specific electronic documents associated with the client and stored in the electronic storage element for a time limit, during a time period, or until an expiration date when control information specifying the persons and entities, the one or more types of access via the interface, the specific electronic documents associated with the client and stored in the electronic storage element, and the time limit, the time period, or the expiration date, is input via the interface, wherein the one or more types of access via the interface are selected from the group of types of access consisting of:
        (i) access via the interface to view the specific electronic documents associated with the client and stored in the electronic storage element,
        (ii) access via the interface to edit the specific electronic documents associated with the client and stored in the electronic storage element, and
        (iii) access via the interface to remove the specific electronic documents associated with the client and stored in the electronic storage element;
    adding at least one electronic document to be associated with the client and stored in the electronic storage element;
    storing the at least one electronic document associated with the client in the electronic storage element, wherein the at least one electronic document to be associated with the client and stored in the electronic storage element is automatically associated with the client and stored in the electronic storage element upon adding the at least one electronic document to be associated with the client and stored in the electronic storage element;
    allowing a first at least one type of access via the interface by a first one or more person and/or entity other than the client, to a first one or more of the at least one electronic document associated with the client and stored in the electronic storage element for a first time limit, during a first time period, or until a first expiration date, by inputting via the interface a first control information specifying the first one or more person and/or entity, the first one or more of the at least one electronic document associated with the client and stored in the electronic storage element, the first at least one type of access via the interface, and the first time limit, the first time period, or the first expiration date, wherein the first control information causes the system to allow the first at least one type of access via the interface, by the first one or more person and/or entity, to the first one or more of the at least one electronic document associated with the client and stored in the electronic storage element, for the first time limit, during the first time period, or until the first expiration date, wherein the system denies access via the interface by persons or entities other than the client, other than the first one or more person and/or entity other than the client, to the first one or more of the at least one electronic document associated with the client and stored in the electronic storage element, wherein the system denies types of access via the interface, other than the first at least one type of access via the interface, to the first one or more of the at least one electronic document associated with the client and stored in the electronic storage element by the first one or more person and/or entity other than the client for the first time limit, during the first time period, or until the first expiration date, wherein the system denies access via the interface by the first one or more person and/or entity other than the client to at least one electronic document associated with the client and stored in the electronic storage element, at times other than for the first time limit, during the first time period, or until the first expiration date, wherein the client and the first one or more person and/or entity interconnect with the system via the interface, via the world wide web infrastructure.

2. The method according to claim 1, wherein inputting the first control information comprises the client inputting the first control information.

3. The method according to claim 1, further comprising:
allowing a second at least one type of access via the interface by a second one or more person and/or entity to a second one or more of the at least one electronic document associated with the client and storage in the electronic storage element by inputting second control information specifying the second one or more of the at least one electronic document associated with the client and storage in the electronic storage element and the second at least one type of access via the interface, wherein the second control information causes the system to allow the second at least one type of access via the interface by the second one or more person and/or entity to the second one or more of the at least one electronic document associated with the client and storage in the electronic storage element.

4. The method according to claim 1, wherein at least one of the at least one electronic document is encrypted.

5. The method according to claim 1, further comprising:
creating at least one of the at least one electronic document.

6. The method according to claim 5, wherein creating the at least one of the at least one electronic document comprises the client creating the at least one of the at least one electronic document.

7. The method according to claim 1, wherein the first one or more person and/or entity comprises a professional.

8. The method according to claim 1, wherein a first electronic document of the at least one electronic document is a personal financial statement.

9. The method according to claim 5, wherein the at least one of the at least one electronic document is time stamped upon creation.

10. The method according to claim 1, further comprising:
editing at least one of the at least one electronic document.

11. The method according to claim 10, wherein the at least one of the at least one electronic document is time stamped upon completion of editing.

12. The method according to claim 5, wherein creating the at least one of the at least one electronic document comprises one of the first one or more person and/or entity creating the at least one of the at least one electronic document, wherein the first at least one type of access via the interface includes access via the interface to add additional electronic documents.

13. The method according to claim 1, wherein the first one or more person and/or entity comprises a professional entity.

14. The method according to claim 1, wherein one or more of the at least one electronic document associated with the client and stored in the electronic storage element is added by the client.

15. The method according to claim 1, wherein the first at least one type of access via the interface comprises access via the interface to add electronic documents to be associated with the client and stored in the electronic storage element, wherein one or more of the at least one electronic document associated with the client and stored in the electronic storage element is added by the first one or more person and/or entity allowed access via the interface to add electronic documents to be associated with the client and stored in the electronic storage element.

16. The method according to claim 1, wherein the system is configured to allow a user to register as a client via the interface.

17. The method according to claim 1, wherein one or more of the at least one electronic document to be associated with the client and stored in the electronic storage element is added via uploading the one or more of the at least one electronic document to be associated with the client and stored in the electronic storage element.

18. The method according to claim 1, wherein one or more of the at least one electronic document to be associated with the client and stored in the electronic storage element is added via creating the one or more of the at least one electronic document to be associated with the client and stored in the electronic storage element, wherein creating the one or more of the at least one electronic document to be associated with the client and stored in the electronic storage element comprises the one or more of the at least one electronic document to be associated with the client and stored in the electronic storage element being created via the system.

19. A system for storing and controlling access to electronic documents, comprising:
an interface; and
an electronic storage element,
wherein a client has access via the interface to add electronic documents to be associated with the client and stored in the electronic storage element, wherein persons and entities other than the client are allowed access via the interface to add electronic documents to be associated with the client and stored in the electronic storage element when control information specifying the persons and entities, and access via the interface to add electronic elements to be associated with the client and stored in the electronic storage element, is input via the interface, wherein the client has access via the interface to
  (i) view electronic documents associated with the client and stored in the electronic storage element,
  (ii) edit electronic documents associated with the client and stored in the electronic storage element, and
  (iii) remove electronic documents associated with the client and stored in the electronic storage element,
wherein persons and entities other than the client are allowed one or more types of access via the interface with respect to specific electronic documents associated with the client and stored in the electronic storage element for a time limit, during a time period, or until an expiration date when control information specifying the persons and entities, the one or more types of access via the interface, the specific electronic documents associated with the client and stored in the electronic storage element and the time limit, the time period, or the expiration date, is input via the interface, wherein the one or more types of access via the interface are selected from the group of access types consisting of:
  (i) access via the interface to view the specific electronic documents associated with the client and stored in the electronic storage element,
  (ii) access via the interface to edit the specific electronic documents associated with the client and stored in the electronic storage element, and
  (iii) access via the interface to remove the specific electronic documents associated with the client and stored in the electronic storage element;
wherein the system is configured such that when at least one electronic document to be associated with the client and stored in the electronic storage element is added and stored in the electronic storage element,
  (i) wherein the at least one electronic document to be associated with the client and stored in the electronic storage element is automatically associated with the client and stored in the electronic storage element upon adding the at least one electronic document to be associated with the client and stored in the electronic storage element; and
  (ii) a first at least one type of access via the interface by a first one or more person and/or entity other than the client, to a first one or more of the at least one electronic document associated with the client and stored in the electronic storage element for a first time limit, during a first time period, or until a first expiration date, is allowed by inputting via the interface first control information specifying the first one or more person and/or entity, the first one or more of the at least one electronic document associated with the client and stored in the electronic storage element, the first at least one type of access via the interface, and the first time limit, the first time period, or the first expiration date,
wherein the first control information causes the system to allow the first at least one type of access via the interface by the first one or more person and/or entity to the first one or more of the at least one electronic document associated with the client and stored in the electronic storage element, for the first time limit, during the first time period, or until the first expiration date,
wherein the system denies access via the interface by persons or entities other than the client, other than the first one or more person and/or entity other than the client, to the first one or more of the at least one electronic document associated with the client and stored in the electronic storage element,
wherein the system denies types of access via the interface other than the first at least one type of access via the interface to the first one or more of the at least one electronic document associated with the client and stored in the electronic storage element by the first one or more person and/or entity other than the client for the first time limit, during the first time period, or until the first expiration date,
wherein the system denies access via the interface by the first one or more person and/or entity other than the client to at least one electronic document associated with the client and stored in the electronic storage element, at times other than for the first time limit, during the first time period, or until the first expiration date,
wherein the system is configured for the interface to interconnect with the client and the first one or more person and/or entity via the world wide web infrastructure.

20. A non-transitory computer-readable medium containing a set of instructions to cause a computer to perform a method, wherein the method comprises:
  providing a system having an interface and an electronic storage element,
  wherein a client has access via the interface to add electronic documents to be associated with the client and stored in the electronic storage element,
  wherein persons and entities other than the client are allowed access via the interface to add electronic documents to be associated with the client and stored in the electronic storage element when control information specifying the persons and entities, and access via the interface to add electronic elements to be associated with the client and stored in the electronic storage element, is input via the interface,
  wherein the client has access via the interface to
    (i) view electronic documents associated with the client and stored in the electronic storage element,
    (ii) edit electronic documents associated with the client and stored in the electronic storage element, and
    (iii) remove electronic documents associated with the client and stored in the electronic storage element,
  wherein persons and entities other than the client are allowed one or more types of access via the interface with respect to specific electronic documents associated with the client and stored in the electronic storage element for a time limit, during a time period, or until an expiration date when control information specifying the persons and entities, the one or more types of access via the interface, the specific electronic documents associated with the client and stored in the electronic storage element, and the time limit, the time period, or the expiration date, is input via the interface, wherein the one or more types of access via the interface are selected from the group of types of access consisting of:
    (i) access via the interface to view the specific electronic documents associated with the client and stored in the electronic storage element,
    (ii) access via the interface to edit the specific electronic documents associated with the client and stored in the electronic storage element, and
    (iii) access via the interface to remove the specific electronic documents associated with the client and stored in the electronic storage element;
  adding at least one electronic document to be associated with the client and stored in the electronic storage element;
  storing the at least one electronic document associated with the client in the electronic storage element, wherein the at least one electronic document to be associated with the client and stored in the electronic storage element is automatically associated with the client and stored in the electronic storage element upon adding the at least one electronic document to be associated with the client and stored in the electronic storage element;

allowing a first at least one type of access via the interface by a first one or more person and/or entity other than the client, to a first one or more of the at least one electronic document associated with the client and stored in the electronic storage element for a first time limit, during a first time period, or until a first expiration date, by inputting via the interface a first control information specifying the first one or more person and/or entity, the first one or more of the at least one electronic document associated with the client and stored in the electronic storage element, the first at least one type of access via the interface, and the first time limit, the first time period, or the first expiration date, wherein the first control information causes the system to allow the first at least one type of access via the interface, by the first one or more person and/or entity, to the first one or more of the at least one electronic document associated with the client and stored in the electronic storage element, for the first time limit, during the first time period, or until the first expiration date, wherein the system denies access via the interface by persons or entities other than the client, other than the first one or more person and/or entity other than the client, to the first one or more of the at least one electronic document associated with the client and stored in the electronic storage element, wherein the system denies types of access via the interface, other than the first at least one type of access via the interface, to the first one or more of the at least one electronic document associated with the client and stored in the electronic storage element by the first one or more person and/or entity other than the client for the first time limit, during the first time period, or until the first expiration date, wherein the system denies access via the interface by the first one or more person and/or entity other than the client to at least one electronic document associated with the client and stored in the electronic storage element, at times other than for the first time limit, during the first time period, or until the first expiration date, wherein the client and the first one or more person and/or entity interconnect with the system via the interface, via the world wide web infrastructure.

\* \* \* \* \*

UNITED STATES PATENT AND TRADEMARK OFFICE
CERTIFICATE OF CORRECTION

Page 1 of 2

PATENT NO. : 8,943,096 B2
APPLICATION NO. : 13/531355
DATED : January 27, 2015
INVENTOR(S) : Job White It is certified that error appears in the above-identified patent and that said Letters Patent is hereby corrected as shown below:

IN THE SPECIFICATION

Column 2,
Line 45, ""Into video"" should read --"Intro video"--.

Column 4,
Line 26, "Tax Returns" should read --1. Tax Returns--.

Column 5,
Lines 63-64, "of in opening" should read --of opening--.

Column 6,
Line 3, "Into video" should read --Intro video--.

Column 7,
Line 41, "cleat the text" should read --clear the text--.

Column 8,
Line 42, "not?" should read --not.--.
Line 43, "users email" should read --user's email--.
Line 44, "entered is not" should read --entered are not--.

Column 15,
Line 25, "for read," should read --for reading,--.

Column 16,
Line 7, "powers. areas an example," should read --powers. As an example,--.

Signed and Sealed this
Thirteenth Day of October, 2015

Michelle K. Lee
*Director of the United States Patent and Trademark Office*

CERTIFICATE OF CORRECTION (continued)
U.S. Pat. No. 8,943,096 B2

IN THE SPECIFICATION

<u>Column 17,</u>
Lines 30-31, "documents. seethe" should read --documents. The--.
Line 41, "document. about the" should read --document. The--.

<u>Column 18,</u>
Line 28, "to unshared" should read --to unshare--.
Line 40, "system, to the client" should read --system, the client--.

<u>Column 19,</u>
Line 14, "can shown" should read --can show--.

<u>Column 21,</u>
Line 9, "fowl" should read --from--.